(12) United States Patent
Gentile et al.

(10) Patent No.: US 11,898,333 B2
(45) Date of Patent: Feb. 13, 2024

(54) HEAT AND MASS EXCHANGER MADE WITH ALGINATE-BENTONITE BIOCOMPOSITE HYDROGEL FOR WATER VAPOR CAPTURE, AND PRODUCTION PROCESS THEREOF

(71) Applicants: POLITECNICO DI TORINO, Turin (IT); PRINCETON UNIVERSITY, Princeton, NJ (US)

(72) Inventors: Vincenzo Maria Gentile, Turin (IT); Marco Simonetti, Turin (IT); Francesco Neirotti, Turin (IT); Michael Bozlar, Princeton, NJ (US); Forrest Meggers, Princeton, NJ (US)

(73) Assignees: POLITECNICO DI TORINO, Turin (IT); PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 18/005,188

(22) PCT Filed: Jul. 13, 2021

(86) PCT No.: PCT/IB2021/056276
§ 371 (c)(1),
(2) Date: Jan. 12, 2023

(87) PCT Pub. No.: WO2022/013724
PCT Pub. Date: Jan. 20, 2022

(65) Prior Publication Data
US 2023/0313507 A1    Oct. 5, 2023

(30) Foreign Application Priority Data

Jul. 13, 2020 (IT) .................. 102020000016996

(51) Int. Cl.
| | | |
|---|---|---|
| E03B 3/28 | (2006.01) | |
| B01D 53/26 | (2006.01) | |
| B01D 53/28 | (2006.01) | |
| B01J 20/24 | (2006.01) | |
| B01J 20/12 | (2006.01) | |
| B01J 20/30 | (2006.01) | |
| B01J 20/28 | (2006.01) | |

(52) U.S. Cl.
CPC .............. *E03B 3/28* (2013.01); *B01D 53/261* (2013.01); *B01D 53/265* (2013.01); *B01D 53/28* (2013.01); *B01J 20/12* (2013.01); *B01J 20/24* (2013.01); *B01J 20/28045* (2013.01); *B01J 20/3007* (2013.01); *B01J 20/3085* (2013.01); *B01D 2253/25* (2013.01); *B01D 2253/3425* (2013.01); *B01D 2257/80* (2013.01); *B01J 2220/46* (2013.01)

(58) Field of Classification Search
CPC ....... E03B 3/28; B01D 53/261; B01D 53/265; B01D 53/28; B01D 2253/25; B01D 2253/3425; B01D 2257/80; B01J 20/12; B01J 20/24; B01J 20/28045; B01J 20/3007; B01J 20/3085; B01J 2220/46
USPC .......................................................... 502/404
See application file for complete search history.

(56) References Cited

U.S. PATENT DOCUMENTS

| | | |
|---|---|---|
| 6,336,957 B1 | 1/2002 | Tsymerman |
| 6,511,525 B2 | 1/2003 | Spletzer et al. |
| 6,684,648 B2 | 2/2004 | Faqih |
| 7,861,544 B2 | 1/2011 | Ferreira et al. |
| 8,118,912 B2 | 2/2012 | Rodriguez |
| 8,506,675 B2 | 8/2013 | Ellsworth |
| 8,607,583 B2 | 12/2013 | Morgan |
| 8,627,673 B2 | 1/2014 | Hill |
| 8,876,956 B2 | 11/2014 | Ball et al. |
| 10,640,954 B2 | 5/2020 | Kim et al. |
| 2007/0028769 A1 | 2/2007 | Eplee |
| 2008/0093059 A1 | 4/2008 | Nishida |
| 2010/0083673 A1 | 4/2010 | Merritt |
| 2012/0067555 A1 | 3/2012 | Sueoka |

(Continued)

FOREIGN PATENT DOCUMENTS

| | | |
|---|---|---|
| CA | 2736085 A1 | 7/2011 |
| CN | 2675002 Y | 2/2005 |

(Continued)

OTHER PUBLICATIONS

Markus J. Kalmutzki, et al., Metal-Organic Frameworks for Water Harvesting from Air, Advanced Materials, 2018, pp. 1-26, vol. 30.

(Continued)

*Primary Examiner* — Edward M Johnson
(74) *Attorney, Agent, or Firm* — Bayramoglu Law Offices LLC

(57) ABSTRACT

A high performance ADSorption Heat eXchanger ADS-HX includes a hygroscopic composite biopolymer, a heat exchange medium in contact with the hygroscopic composite biopolymer and a hollow conduit in contact with the heat exchange medium, into which hollow conduit either a cooling fluid or a heating fluid are alternately made to pass, so that the adsorption heat exchanger can be operated under high ambient temperatures and low relative humidity conditions, which are typical of arid climates. A process is provided for producing the aforesaid high performance ADSorption Heat eXchanger ADS-HX. A preferred and advantageous application of the aforesaid high performance ADSorption Heat eXchanger ADS-HX is in combination with the atmospheric water harvesting device described in the international application published at no. WO 2019/082000 A1 of the same Applicant.

10 Claims, 7 Drawing Sheets

(56) References Cited

U.S. PATENT DOCUMENTS

| 2016/0195312 A1 | 7/2016 | Sawyer et al. |
| 2017/0276380 A1 | 9/2017 | Sakikawa et al. |
| 2020/0141095 A1 | 5/2020 | Seeley |

FOREIGN PATENT DOCUMENTS

| CN | 110743507 A | 2/2020 |
| CN | 105229386 B | 3/2020 |
| JP | 2008292061 A | 12/2008 |
| KR | 20160087805 A | 7/2016 |
| TW | 593849 B | 6/2004 |
| WO | 2016081863 A1 | 5/2016 |
| WO | 2018002918 A1 | 1/2018 |
| WO | 2018167774 A1 | 9/2018 |
| WO | 2019071202 A1 | 4/2019 |
| WO | 2019082000 A1 | 5/2019 |

OTHER PUBLICATIONS

Angelo Freni, et al., SAPO-34 coated adsorbent heat exchanger for adsorption chillers, Applied Thermal Engineering, 2015, pp. 1-7, vol. 82.

Hyunho Kim, et al., Water harvesting from air with metal-organic frameworks powered by natural sunlight, Science, 2017, pp. 430-434, vol. 356.

Hyunho Kim, et al., Adsorption-based atmospheric water harvesting device for arid climates, Nature Communications, 2018, pp. 1-8, vol. 9.

Nikita Hanikel, et al., Rapid Cycling and Exceptional Yield in a Metal-Organic Framework Water Harvester, ACS Central Science, 2019, pp. A-H.

J.G. Ji, et al., New composite adsorbent for solar-driven fresh water production from the atmosphere, Desalination, 2007, pp. 176-182, vol. 212.

J.Y. Wang, et al., Experimental investigation on two solar-driven sorption based devices to extract fresh water from atmosphere, Applied Thermal Engineering, 2017, pp. 1608-1616, vol. 127.

Renyuan Li, et al., Harvesting Water from Air: Using Anhydrous Salt with Sunlight, Environmental Science and Technolgy, 2018, pp. 5398-5406, vol. 52.

Renyuan Li, et al., Hybrid Hydrogel with High Water Vapor Harvesting Capacity for Deployable Solar-Driven Atmospheric Water Generator, Environmental Science and Technolgy, 2018, pp. 11367-11377, vol. 52.

Renyuan Li, et al., Improving atmospheric water production yield: Enabling multiple water harvesting cycles with nano sorbent, Nano Energy, 2020, pp. 1-11, vol. 67.

HEAT AND MASS EXCHANGER MADE WITH ALGINATE-BENTONITE BIOCOMPOSITE HYDROGEL FOR WATER VAPOR CAPTURE, AND PRODUCTION PROCESS THEREOF

CROSS REFERENCE TO THE RELATED APPLICATIONS

This application is the national phase entry of International Application No. PCT/IB2021/056276, filed on Jul. 13, 2021, which is based upon and claims priority to Italian Patent Application No. 102020000016996, filed on Jul. 13, 2020, the entire contents of which are incorporated herein by reference.

TECHNICAL FIELD

The present invention refers to the energy field and, specifically, to adsorb and store water vapor directly from ambient air in any type of climate.

In particular, the present invention is relevant to an adsorption heat exchanger.

The present invention also regards a process for producing the aforesaid adsorption heat exchanger.

The adsorption heat exchanger of the present invention is preferably and advantageously applied in combination with the atmospheric water harvesting device described in the international application published at no. WO 2019/082000 A1 of the same Applicant.

The preferred areas of application of the present invention are atmospheric water harvesting (production of freshwater, using the atmosphere as spring, for civil, agriculture and industrial end uses) and air dehumidification for drying industry and air conditioning (removal of water vapor from air streams used as process fluid industrial applications-such as food and/or goods drying, pneumatic sector, etcetera-and/or human thermal comfort applications).

BACKGROUND

Nowadays, 1.2 billion people live in areas of physical water scarcity and an additional 500 million people are approaching physical water scarcity; in addition, 1.6 billion people have to face economic water shortage and 844 million people do not have access to a basic drinking-water service.

Among these, 159 million people depend on surface water that is often polluted and considered non-potable according to many standards of developed countries.

It is estimated that 17% of the urban sub-Saharan population does not have access to a sanitary source of water; approximately 30% of schools have no access to clean water.

One out of two urban residents in developing countries are still affected by diseases related to insufficient access to drinkable water; contaminated water is estimated to cause more than half million dysentery deaths each year.

Health costs associated with waterborne diseases such as malaria, dysentery, and worm infections represent more than one third of the salary of poor households in sub-Saharan Africa.

Over 60 million of US inhabitants does not trust tap water and about 20% of American households rely on low quality groundwater.

These impressive numbers highlight how crucial it is to find reliable, sustainable and affordable solutions to provide freshwater even in remote areas.

Therefore, a need still exists to solve the problem of water vapor separation/capture from ambient air for the purpose of atmospheric water harvesting.

In atmospheric water harvesting, the capability of capturing large amounts of water vapor from ambient air and converting it into drinkable freshwater, can respond to the increasing demand for freshwater in countries affected by physical and/or economical water scarcity.

Existent solutions for water vapor removal from air and conversion to freshwater exploit mainly two approaches: desiccant systems and vapor compression systems.

Desiccant systems exploit the hygroscopic properties of the sorbent materials, which have the ability to directly remove water vapor upon exposure to air; regeneration of the desiccant material is required after the saturation with moisture to reactivate its initial absorbing properties; water uptake rate and capacity of sorbent materials define their performance (the latter are dependent on ambient air condition, in particular, low water vapor content in the ambient air leads to low water uptake and higher regeneration temperature).

Examples of desiccant systems are described in U.S. Pat. No. 8,118,912 B2 titled "LOW POWER ATMOSPHERIC WATER GENERATOR"; U.S. Pat. No. 8,876,956 B2 titled "SYSTEM FOR WATER RECOVERY INLUDING MULTIPLE POWER SOURCES"; U.S. Pat. No. 10,640,954 B2 titled "SORPTION-BASED ATMOSPERIC WATER HARVESTING DEVICE"; WO 2018002918 A1 titled "LIQUID DESICANT VAPOR SEPARATION SYSTEM"; U.S. Pat. No. 6,511,525 B2 titled "METHOD AD APPARATUS FOR EXTRACTING WATER FROM AIR USING A DESICCANT"; US 20070028769 A1 titled "METHOD AND APPARATUS FOR PRODUCING POTABLE WATER FROM AIR INLUDIG SEVEREY ARID AD HOT CLIMATES"; U.S. Pat. No. 6,336,957B1 titled "METHOD AND APPARATUS FOR ETRACTING WATER FROM ATMOSPHERIC AIR"; WO 2016081863 titled "SYSTEMS AND METHODS FOR GENERTING LIQUID WATER FROM AIR"; WO 2019071202 A1 titled "SYSTEMS FOR GENERATING WATER WITH WASTE HEAT AND RELATED METHODS THEREFOR" . However, the technical solution disclosed in U.S. Pat. No. 8,118,912 B2 is a system to provide drinkable water based on desiccant wheel capturing moisture from ambient air. These rotors are then regenerated to condense the produced vapor. This solution has the disadvantage of using desiccant wheel as desiccant component. This type of component cannot perform the co-located heat ad mass transfer. Consequently, hotter and drier climates require high regeneration temperature with negative effects on efficiencies and water productivity. Further, the condensation stage is driven by a vapor compression refrigeration cycle, increasing power intensity of that solution.

However, the technical solution disclosed in U.S. Pat. No. 8,876,956 B2 is a system for removing the air moisture with a liquid desiccant, and a subsequent extraction cycle driven by an external heat source to recover collected water in a condensing chamber. This solution has the disadvantage of directly using calcium chloride directly in contact with other machine components and materials. This desiccant fluid is highly corrosive generating numerous maintenance issues. Further on, component manufacturing doesn't expect the possibility of co-located heat and mass transfer and the recovery of latent heat from vapor condensation.

However, the technical solution disclosed in U.S. Pat. No. 10,640,954 B2 is a passive water harvesting device based on metal-organic framework hygroscopic materials. The regeneration is obtained exposing the material to the sunlight, with an irradiation close to 1 kW/m2, and dissipating condensation heat to external environment through a passive metallic heat sink. This solution has the disadvantage of using a passive condenser. This limits the heat rejection required for water condensation. Further, component manufacturing limits the regeneration process only through the exposition of the sorbent to direct sunlight. This limits the exploitation of alternative sources of heat, such as the waste heat. Further on, the scalability of that solution is limited by the availability of free surface exposed to sunlight, with an extension proportional to water needs.

However, the technical solution disclosed in WO 2018002918 A1 is an atmospheric moisture harvesting system, in which water vapor is separated from the air using a liquid desiccant subsystem. A refrigeration unit condenses the water vapor released from the liquid desiccant regenerated with solar heat. This solution has the disadvantage of exploiting an auxiliary refrigeration cycle, at temperature between 4-15° C., to drive water condensation, reducing the energetic advantages give from the use of desiccant sorbents. At the end this solution requires a consistent amount of heat for the desiccant regeneration, and a consistent amount of power for condensation.

However, the technical solution disclosed in U.S. Pat. No. 6,511,525 B2 is a method and apparatus for extracting liquid water by the adsorption of water from air into a desiccant and compressing the water vapor released from the sorbent regeneration for the condensation of the same vapor into liquid water. This solution has the disadvantage of requiring mechanical energy, then electrical power, to drive the adsorption/regeneration/condensation cycle for water generation; Indeed the regeneration is realized creating depression in the sorbent chamber, instead of using solar heat, or other economic source of heat for regeneration. Further on, the condensation requires active components with a consistent electric power demand.

However, the technical solution disclosed in US 20070028769 A1 is a system using sorption-desorption-condensation cycle with a sorption wheel to extract moisture from ambient air and to concentrate the water vapor driven off from the sorption material in a circulating gas with condensation of liquid water from the circulating gas. As mentioned before, the use of rotating desiccant component working simultaneously in adsorption and regeneration, such as the desiccant wheel, inhibit the possibility of co-located heat and mass transfer. With this approach, a hot and arid climate will require increased regeneration temperatures (>80° C.), respect to a system operating with a co-located heat and mass transfer, for example through isothermal process such as in WO 2019082000 A1 ("METHOD FOR PRODUCTION OF WATER FROM AIR BASED ON LOW-TEMPERATURE HEAT, AND MACHINE AD SYSTEM THEREOF") disclosed by the same authors of this disclosure. Further on, in some configurations the condensation is driven through a refrigeration cycle.

However, the technical solution disclosed in U.S. Pat. No. 6,336,957 B1 is a method and apparatus for extracting water from atmosphere using sorbent material and a thermal swing to variate pressure inside tight sealed chambers to drive alternatively adsorption and desorption processes. This solution has the disadvantage of requiring consistent pressure variations and then pressure tight sealings. Partial vacuum is needed further to condensate the water vapor. This solution has considerable complexity and high operating temperatures, that may preclude the application at very low costs.

However, the technical solution disclosed in WO 2016081863 is a system extracting water vapor from atmospheric air using solar energy and desiccant wheels. As mentioned before, with these type of components regeneration is adiabatic, and high temperatures are required to obtain regeneration in very dry environments However, the technical solution disclosed in WO 2019071202 A1 is a system coupling a desiccant device with a separate heater, powered by an external waste heat source then powering a water harvesting cycle. Being the adsorption/regeneration processes happening simultaneously on some rotating desiccant component, issues on regeneration temperature will be expected especially in hot and arid climate. In the end also in this case, the technical solution adopted as desiccant component is a limiting factor for an improved exploitation of the sorbent material through a co-located heat and mass transfer.

The technology proposed within this present disclosure, contrary from what seen in the referenced literature and non-referenced known literature, is based on an architecture enabling the simultaneous heat and mass transfer, employing the co-located transfer between multiple elements: the sorbent material, the water vapor, and the thermal vector providing heat or cold. Further on sorbent composition permits high performances, at low regeneration temperature and in a wide range of arid conditions, employing an alginate derived hygroscopic biopolymer.

Vapor compression systems exploit a refrigeration cycle using the typical compression process of an evaporating/condensing a fluid to reduce the temperature of air down to the dew point; the water vapor is extracted by condensation at a temperature lower than the relative dew point; power consumption is dependent on ambient air condition (higher the temperature, higher is the energy required to condense water vapor; drier the air, i.e. lower dew point, more energy is required to condense water vapor).

Example of vapor compression systems are described in US 20100083673 A1 titled "WATER PRODUCTION SYSTEM AND METHOD WITH AIR BYPASS"; KR 20160087805 A titled "ATMOSPHERIC WATER GENERATION SYSTEM AND METHOD"; U.S. Pat. No. 6,684,648 B2 titled "APPARATUS FOR THE PRODUCTION OF FRESHWATER FROM EXRTEMELY HOT AND HUMID AIR"; TW 593849 B titled "APPARATUS AND METHOD FOR EXTRACTING POTABLE WATER FROM ATMOSPHERE"; U.S. Pat. No. 7,861,544 B2 titled "APPARATUS AND METHODS FOR CREATING SPARKLING WATER FROM THE ATMOSPHERE"; US 20200141095 A1 titled "REFRIGERATION APPARATUS CONFIGURED TO CAPTURE ATMOSPHERIC WATER"; WO 2018167774 A1 titled "SYSTEM AND METHOD FOR HIGH-EFFICIENCY ATMOSPHERIC WATER GENERATOR AND DEHUMIDIFIER"; CN 2675002 Y titled "DOMESTIC AIR WATER DRINKING MACHINE"; U.S. Pat. No. 8,627,673 B2 titled ATMOSPHERIC WATER HARVESTERS.

However, these technical solution disclosed in all the references related to refrigerated machine through vapor compression units have all in common following disadvantages: is a very intensive electric power technology limiting the exploitation in remote and arid areas, where availability of electricity is as probable as the lack of water. Further on, electricity consumptions depend by dew point of treated air, increasing consistently when this is very low. Further on, auxiliary equipment necessarily needed to drive these technologies through renewable energy, such as photovoltaic or eolic, will increase capital costs and system complexity.

Moreover, a further need still exists to solve the problem of water vapor separation/capture from ambient air for the purposes of air conditioning.

For air conditioning, the removal of water vapor from the conditioned indoor environment leads to improvements in terms of human thermal comfort.

Standard technologies driving this process are very power intensive and, in particular, they are normally carried out using high temperature thermal energy inputs, they do not integrate solar energy and/or they waste heat from the air conditioning system; generally, therefore, the standard technologies are not in accordance with the framework of SDG 7, requesting for a higher exploitation of renewable energy to satisfy the worldwide rise of cooling demand.

Air conditioning known solutions are described, for example in US 20160195312 titled "AIR CONDITIOINING AND WATER HARVESTING"; CA 2736085 titled "COMBINED MR CONDITIONING AND WATER GENERATING SYSTEM"; U.S. Pat. No. 8,607,583 B2 titled "COMBINATION DEHYDRATOR, DRY RETURN AIR AND CONDENSED WATER GENERATOR/DISPENSER"; U.S. Pat. No. 8,506,675 B2 titled "COMPOSITE DESICCANT AND AIR TO WATER SYSTEM AND METHOD"; CN 105229386 B titled "ON-CEILING LIQUID DESICCANT AIR CONDITIOINING SYSTEM".

However, the technical solution disclosed in US 20160195312 is a system providing both air conditioning and atmospheric water harvesting based on vapor compression refrigeration units.

Similarly, the technical solution disclosed in CA 2736085 is a system in which a cooling element condenses water from atmospheric air and is operable to switch between air conditioning mode, for building cooling, and to a pure water generation mode. The cooling element is refrigerated through a vapor compression technology.

The technical solution, disclosed in U.S. Pat. No. 8,607,583 B2 is a portable device to alternately provide water from a reservoir of condensed water, or from alternative source of bottled water. The system can then provide purified water and dry make-up cold air to a home or office or dehydration cabinet. All these three solutions have the disadvantages of typical chillers, mentioned in the previous section about vapor compression technologies. Main issues are concerning energetic cost and intensive use for electric power.

However, the technical solution disclosed in U.S. Pat. No. 8,506,675 B2 employs a composite desiccant material constituted of PVA foam or non-woven fibrous sheet soaked in a solution of $CaCl_2$. A multi-chamber stack of this membrane arranged in sheets, constitutes a system for atmospheric water harvesting. This solution has the disadvantage of employing a membrane to avoid contamination of the air with the direct contact between the desiccant itself and the air. This technical solution increases the resistance to vapor mass transfer, reducing the kinetics of the water production process. Further on being the desiccant a liquid fluid, additional energetic costs will be associated to the pumping of the desiccant to assure the system functioning.

However, the technical solution disclosed in CN 105229386 B is an air conditioning system based on a liquid desiccant. The desiccant is contained in a vapor permeable membrane to avoid contamination of treated air, or leakage of the harmful and highly corrosive liquid desiccant. This solution has the disadvantage of using a selective membrane, permeable only to water vapor, with an associated resistance to vapor mass transfer itself. As before a reduced kinetic of the water production process and the additional energetic costs related to desiccant pumping are the major issues for such a type of technology.

None of the above-mentioned technical solutions, nor any combination thereof, is able to provide an exchanger to adsorb and store water vapor directly from ambient air, so to be feasible for any type of climate, humid or arid.

Moreover, none of the above-mentioned technical solutions, nor any combination thereof, is able to provide an exchanger to perform fast cycle of water capture/regeneration, without being affected by the resistance to mass transfer kinetics.

Moreover, none of the above-mentioned technical solutions, nor any combination thereof, is able to provide an exchanger to increase the total amount of water produced adopting a technical solution that enable the co-located heat and mass transfer Moreover, none of the above-mentioned technical solutions, nor any combination thereof, is able to provide a manufacturing technique to produce exchangers for water vapor capture under even high ambient temperatures and low relative humidity conditions, which are typical of arid climates.

Therefore, even if many technical solutions are available, there still exists the need of water vapor separation/capture systems from ambient air for the purposes of both atmospheric water harvesting and air conditioning.

Specifically, there still exists the need of a high performing, competitive, effective and flexible heat and mass exchanger for water vapor capture.

Moreover, there still exists the need of a process to produce a high performing, competitive, effective and flexible heat and mass exchanger for water vapor separation/capture from ambient air for the purpose of both atmospheric water harvesting and air conditioning.

In brief therefore, up to the present time, to the Applicant's knowledge, there are no known solutions allowing to provide exchangers for water vapor capture and process for producing such exchangers such that:

perform large water uptake capacity in dry climates, specifically water uptake difference between the wet and the dry state of 0.7 $kg_{H2O}$ $kg_{dry\ sorbent}^{-1}$—achievable with an environment of 20-35°, preferably 20-30° C. and 1 kPa of water vapor pressure and a regeneration temperature of 60° C.;

achieve biocompatibility, thanks to the fact that the production process of the sorbent material in its final configuration does not involve the use of toxic compounds; only food-grade chemicals are required for the production process, eliminating any contamination risk of the liquid water produced and/or of the conditioned air;

present a significant performance improvement with respect to the current commercial approaches employed for water vapor capture;

answer to the increasing demand of reliable, sustainable and affordable solutions to provide freshwater even in remote areas;

realize fast cycles of water capture/regeneration;

employ cheap and industrially available starting materials;

manufacture through injection molding: prior the solidification through the gelation process, the sorbent and its constituents are in the form of a viscous fluid; this facilitates the injection of the fluid into a mold first, driving later the gelation at ambient temperature and pressure, creating the desired final shape of the hydrogel;

apply the same process in deep coating over the surface for heat exchange of various substrates (e.g. aluminum, copper, polymeric materials and other thermally conductive and impermeable media);

fabricate the material in a way that can be easily scaled up; the production process of both the material and the component does not require particular efforts on building a specific production environment and this leads to a reduction of costs for the production of the material and component;

provide an easy scalable, low cost and quick functionalizing process for producing exchangers overcoming the drawbacks of the previous proposed technics;

are suitable to be carried out in any climate conditions.

Therefore, the Applicant, with the exchanger for water vapor capture and the relevant process for producing such exchanger according to the present invention, intends to remedy such lacks.

SUMMARY

It is an object of the present invention to overcome the drawbacks of the known prior art related to water vapor separation/capture systems from ambient air for the purposes of both atmospheric water harvesting and air conditioning.

It is a specific object of the present invention to overcome the drawbacks of the known prior art related to high performing, competitive, effective and flexible heat and mass exchangers for water vapor capture.

It is a more specific object of the present invention to overcome the drawbacks of the known prior art related to exchangers for water vapor capture under even high ambient temperatures and low relative humidity conditions, which are typical of arid climates.

The present invention intends to solve the problem of water vapor separation/capture from ambient air for the purpose of both atmospheric water harvesting and air conditioning.

In particular, the present invention aims at providing a high performing, competitive, effective and flexible heat and mass exchanger for water vapor capture.

The present invention also aims at providing a process to produce a high performing, competitive, effective and flexible heat and mass exchanger for water vapor separation/capture from ambient air for the purpose of both atmospheric water harvesting and air conditioning.

The present invention finds a preferred and advantageous application in combination with the atmospheric water harvesting device described in the international application published at no. WO 2019/082000 A1 of the same Applicant.

The aforesaid and other objects and advantages of the invention, as will appear from the following description, are achieved with an adsorption heat exchanger according to claim 1.

Moreover, the aforesaid and other objects and advantages of the invention are achieved with an atmospheric water harvesting device according to claim 6.

Moreover, the aforesaid and other objects and advantages of the invention are achieved with a process for producing an adsorption heat exchanger according to claim 7.

Preferred embodiments and variants of the adsorption heat exchanger and of the production process of the present invention are the subject-matter of the dependent claims.

It is understood that all the annexed claims form an integral part of the present description and that each of the technical features therein claimed is possibly independent and autonomously usable with respect to the other aspects of the invention.

It will be immediately evident that several modifications (for example relevant to shape, sizes, arrangements and parts with equivalent functionality) could be brought to what described without departing from the scope of the invention as claimed in the appended claims.

Advantageously, the technical solution according to the present invention allows to:

perform large water uptake capacity in dry climates: water uptake of 0.7 $kg_{H2O}$ $kg_{dry\ sorbent}^{-1}$ (on the dry basis) are achievable with an environment of 20-35°, preferably 20-30° C. and 1 kPa of water vapor pressure;

achieve biocompatibility: the production process of the sorbent material in its final configuration does not involve the use of toxic compounds; only food-grade chemicals are required for the production process, eliminating any contamination risk of the conditioned air and/or the liquid water produced;

realize manufacturability through injection molding: prior the solidification through the gelation process, the sorbent and its constituents are in the form of a viscous fluid; this facilitates the injection of the fluid into a mold first, driving later the gelation at ambient temperature and pressure, creating the desired final shape of the hydrogel. It is worthy to note that the same process can be applied in deep coating over the surface for heat exchange of various substrates (e.g. aluminum, copper, polymeric materials, etcetera);

carry out fabrication of the material can be easily scaled up: the production process of both the material and the component does not require particular efforts on building a specific production environment; this leads to a reduction of costs for the production of the material and component.

Further advantageous features will appear more evident from the following description of preferred but not exclusive embodiments, merely given by way of explanatory and not limiting example.

BRIEF DESCRIPTION OF THE DRAWINGS

The present invention will be described hereinbelow by means of some preferred embodiments, given by way of explanatory and not limiting example, with reference to the accompanying drawings. These drawings illustrate different aspects and examples of the present invention and, where appropriate, similar structures, components, materials and/or elements in different figures are denoted by similar reference numbers.

DETAILED DESCRIPTION OF THE EMBODIMENTS

Figure 1A:
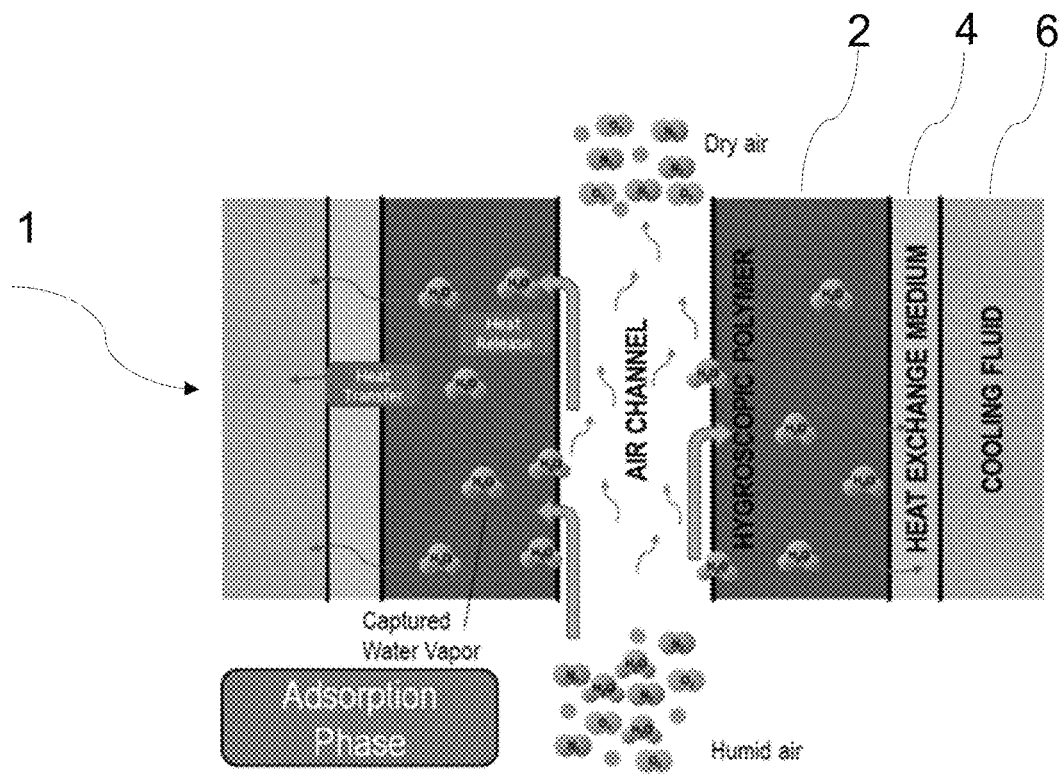
FIG. 1A shows a schematic representation of the adsorption phase of the batch functioning of the ADS-HX with the hygroscopic polymer according to the present invention.

While the invention is susceptible of various modifications and alternative constructions, some preferred embodiments are shown in the drawings and will be described in detail hereinbelow.

It should be understood, however, that there is no intention to limit the invention to the specific illustrated embodiments but, on the contrary, the invention intends to cover all the modifications, alternative constructions and equivalents that fall within the scope of the invention as defined in the claims.

In the following description, therefore, the use of "for example", "etc." and "or" denotes non-exclusive alternatives without limitation, unless otherwise indicated; the use of "also" means "among, but not limited to", unless otherwise indicated; the use of "includes/comprises" means "includes/comprises, but not limited to", unless otherwise indicated.

In the present specification, the following terms have the following meanings:

"heat and mass exchanger" means a component with the function of providing the support for the exchange of heat and mass of water (in the form of vapor) between the air, the sorbent and the thermal vector;

"composite" means a media in which the material composition is significantly shared among constituents of different nature. The assembly of the different constituents realize a composite with improved properties respect to single constituent;

"biocomposite" means a composite media in which main constituents are derived from natural matter, or are constituted of natural matter, or are the result of biological activity;

"biopolymer" means a polymeric structures of monomer derived from natural matter, or the result of biological activity;

"hydrogel" means a colloidal gel constituted of hydrophilic polymeric chains usually dispersed in water. In the specific of this disclosure is the solid resultant from the ionotropic gelation of polysaccharide chains of sodium alginate "hygroscopic" means the capacity of attracting first, and holding later water molecules, in the form of water or liquid via absorption and/or adsorption;

"hygroscopic composite biopolymer" means a composite in which main constituents have both or singularly the properties defined by "hygroscopic" and "biopolymer"; in the present specification the terms "hygroscopic composite biopolymer", "sorbent mean" and "sorbent polymer" are used indistinguishably, as synonyms;

"heat exchange medium" means a component with the function of providing the support for the exchange of heat between two or more materials;

"cooling fluid" means a heat vector, constituted by a fluid (liquid or gas), with the function to remove the heat from a specific material (either solid, gas or liquid) or more than one;

"heating fluid" means a heat vector, constituted by a fluid (liquid or gas), with the function to provide heat to a specific material (either solid, gas or liquid) or more than one;

"adsorption phase" means the period of time during which the direction of water mass transfer is from the air bulk to the sorbent porous structure; in the present specification the terms "adsorption" and "capture" are used indistinguishably, as synonyms;

"regeneration phase" means the period of time during which the direction water mass transfer is from the sorbent porous structure to the air bulk; in the present specification the terms "regeneration" and "release" are used indistinguishably, as synonyms;

"high performance/high performing" means an improvement on the intrinsic characteristic influencing the functioning and performances of the component/material. The used term of "high performances" and similar means: reduced time for complete adsorption and regeneration; higher water uptake at lower relative humidity and higher outdoor temperature; a reduced regeneration temperature; an increased water uptake difference between the end of the adsorption state and the end of the regeneration state; reduced mass transfer resistance, both conductive and diffusive;

"homogeneous fluid" means a fluid constituted of material of different nature and phase and intimately mixed such that, the concentration of the different single elements or phases is overall constant;

"mass transfer" means a transfer of mass, in this case is intended a mass of water vapor, between the air mixture and the sorbent material, both in adsorption or regeneration;

The present invention is based on the innovative concept of providing a new exchanger made of an innovative material and having an innovative geometry, thus being able to water vapor capture from ambient air under even high ambient temperatures and low relative humidity conditions, which are typical of arid climates, for the purposes of both atmospheric water harvesting and air conditioning.

Specifically, the present invention provides a high performing, competitive, effective and flexible heat and mass exchanger for water vapor capture.

The present invention finds a preferred and advantageous application in combination with the atmospheric water harvesting device described in the international application published at no. WO 2019/082000 A1 of the same Applicant.

Independent aspects of the present invention, which will be described in detail hereinafter with reference to FIGS. 1 to 7, refer to:

an adsorption heat exchanger 1;
an atmospheric water harvesting device 10 including at least one adsorption heat exchanger 1; and
a process for producing an adsorption heat exchanger 1.

The present invention discloses an innovative high performance ADSorption Heat eXchanger ADS-HX 1 using a hygroscopic composite biopolymer, or sorbent mean, 2; the present invention also discloses an innovative procedure for the realization of said high performance ADSorption Heat eXchanger 1.

The following description explains in order: i) functionality and motivation for the use of the ADS-HX, and ii) production procedure of the ADS-HX with the composite biopolymer.

i) Functionality and Motivation

The ADS-HX 1 is a component working in a batch process and performing co-located heat and mass transfer.

The working principle is based on the alternation of capture/release phases of water vapor (the process is called "mass transfer"), combined with the thermal exchange between the sorbent material 2 and a source of cold/hot 6, 8 (the process is called "heat transfer").

The co-location of the heat transfer with the mass transfer leads to higher rates of water vapor exchanged between the air mixture and the sorbent material 2.

The contact area between the sorbent 2 and the heat exchange medium 4 is increased using a honeycomb geometry, minimizing the pressure drops generated during the flow of air through the sorbent channels.

Figure 1B:
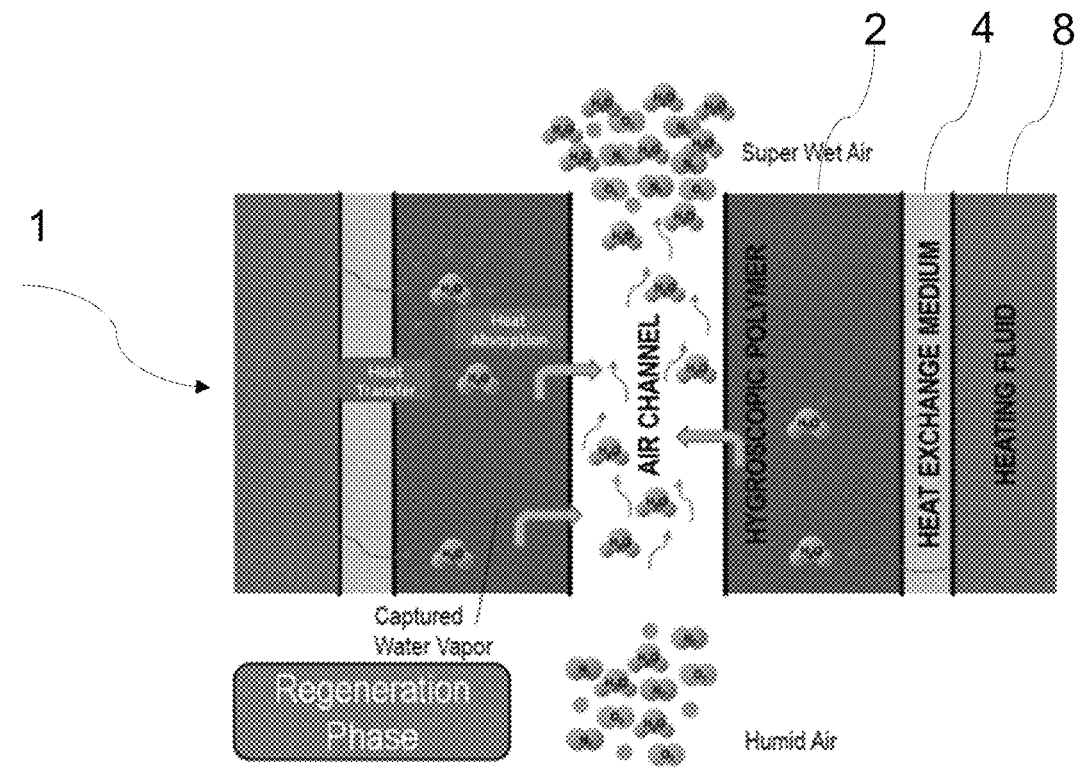
FIG. 1B shows a schematic representation of the regeneration phase of the batch functioning of the ADS-HX with the hygroscopic polymer according to the present invention.

With reference to FIG. 1, during the capture phase (also called "adsorption phase") a stream of humid air flows through channels realized with the sorbent polymer 2.

In the contact area air/sorbent the water vapor is separated from air and stored inside the pores of the hygroscopic polymer 2.

Being that process exothermic, a considerable amount of heat (called "adsorption heat" and being of approximately 2,500 kJ kg$^{-1}$, and anyway less than 50 kJ mol$^{-1}$) is released, increasing the equilibrium temperature of both the sorbent 2 and the air, with a consequential reduction of the separation and capture rate of water vapor from humid air. Indeed, as clear from FIG. 4, moving the adsorption operation towards higher temperatures, means a reduced water uptake of the sorbent at the equilibrium with mentioned air mixture.

The presence of a heat exchange medium 4 gives the possibility to remove that adsorption heat from the sorbent material 2, allowing an isothermal or subcooled process, by the transferring the produced adsorption heat to a cooling fluid, and rejecting it to an external heat sink (20° C.<$T_{sink}$<40° C.).

An impermeable and conductive frame separate the cooling fluid 6 from the sorbent material 2, avoiding the bypass of water and allowing only the transfer of energy through heat conduction between the sorbent/air and the cooling vector.

The outlet air stream from the sorbent channel is drier and colder than inlet, such that it can be used for any air conditioning application or industrial drying process. Eventually, when the outlet air is treated through evaporative cooling, the configuration fall in the case of Desiccant Evaporative Cooling technologies for building Air Conditioning. The adsorption phase continues until the saturation of the sorbent means (with a temperature of 30° C., the water uptakes can be higher than 0.7 $kg_{H2O}$ $kg_{dry\ sorbent}^{-1}$).

When the saturation is reached, the ADS-HX 1 is switched to the regeneration phase, inverting the direction of the heat and mass transfer.

This time, the cooling fluid 6 is substituted with a heating fluid 8, delivering heat from a hot source ($T_{hot}$<100° C. and preferentially around 60° C. to take advantage of solar energy or waste heat from industry or processes) to the sorbent material 2.

This provides an energy (2,500-3,000 kJ kg$^{-1}$—approximatively 2,500 kJ kg$^{-1}$) to water molecules previously trapped in the pores of the hygroscopic polymer 2, activating a diffusive flux of water from the wet sorbent to the air flowing in the same channel.

The homogeneous heat transfer, realized through a continuous and extended contact between the sorbent 2 and the conductive frame for the heat exchange, increases and makes faster the water transfer phenomena.

The outlet air stream is now hot and extremely wet, with a very high dew point such that the spontaneous condensation is driven at ambient temperature and liquid water is collected. If during this phase the ADS-HX is coupled to the method mentioned in WO 2019/082000 A1, from the same Applicant. It is worthy to note that an improved water harvesting device is achieved without the use of refrigeration or cooling cycles to condense water out of air, and using thermal energy at 60° C.

The regeneration process continues until the sorbent polymer 2 reaches its dry state.

ii) Production Procedure

The ADS-HX 1 is realized combining an air/liquid or an air/gas heat exchange medium 4 with an hygroscopic polymer 2, such that the high contact area between air/sorbent/heat exchange medium allows enhanced transfer rate of water vapor and energy, with low pressure drops on the air side.

The heat exchange medium 4 is made of a material chosen from metallic materials, plastic material and any conductive composite.

The hygroscopic polymer 2 is obtained through ionotropic gelation of sodium alginate, which is a polysaccharide widely distributed in cell walls of brown algae.

The first step of the production procedure of the ADS-HX 1 is the realization of a viscous gel containing the main components of the hygroscopic polymer, i.e. sodium alginate and calcium bentonite.

The viscous gel is prepared by mixing the powder of sodium alginate (2% by weight) and calcium bentonite (4-10% by weight) with deionized water, until the complete mixing and a homogeneous fluid is obtained.

The calcium bentonite powder was dissolved in 1 Liter of deionized water DIW (1-20% by weight) and stirred at high rotation speed for 1 hour (>700 rpm).

The solution is filtered multiple times (final mesh<5 μm) to remove impurities and not dissolved particles from water/bentonite liquid solution, alternate with stirring phases of reduced time (10 mins and rotational speed>700 rpm).

In bentonite/DIW solution is added a gelling agent, such as the sodium salt from the alginic acid, within 0.5-4% of concentration, and rapidly mixed until the complete homogeneity of the solution.

The obtained viscous gel is degassed, under vacuum at relative pressure between 200-500 mbar for at least 20 minutes.

In parallel a DIW/CaCl$_2$ solution is prepared (5-40% by weight of CaCl$_2$), with a continuous stirring of the water and salt until the use and temperature of the solution reduces to ambient temperature.

The viscous and degassed gel, i.e. the viscous and degassed solution of sodium alginate/bentonite/DIW, is injected in a prefabricated mold, with the optimized geometry for the specific process, i.e. a honeycomb geometry.

Then, the entire mold is deeply immersed in the DIW/CaCl$_2$ solution for at least 12 hours until complete jellification.

The sodium alginate, which is a polymer constituted of repeating blocks of guluronate and mannuronate monomers, is the starter of a crosslinking process that, in the presence of an ionic solution with water and divalent cations (Ca$^{+2}$, Mg$^{+2}$, etcetera), leads to the jellification of the viscous fluid into a solid hydrogel.

During this process, the bentonite fills the space between the polymeric chains and, being a hygroscopic clay with a very high level of porosity, increases the water capture capacity of the composite polymer material.

The crosslinking process, transforming the viscous gel in a solid hydrogel, is realized with an ionotropic gelation technique in which the Nat, contained as functional group in the alginate, is exchanged with Ca$^{+2}$ (or one of the others mentioned before) cation dissolved in a water solution.

Having the Calcium a higher valence number, this activated a crosslinking among the different polymeric chains of the alginate, realizing the so called "egg-box geometry".

This process is carried out inside a mold, to shape the hydrogel in a desired geometry.

Figure 2:
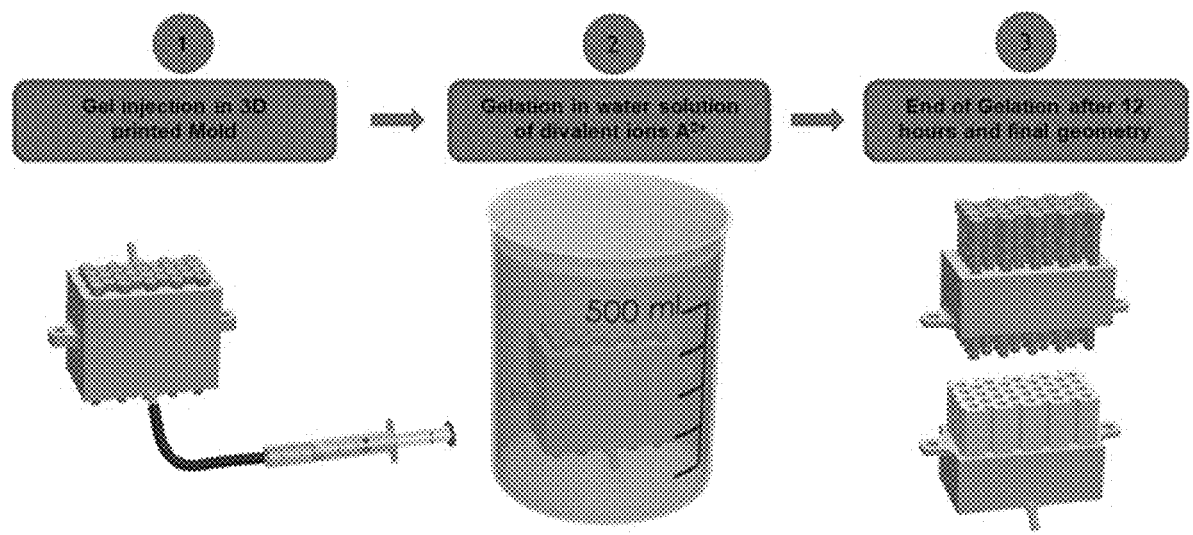
FIG. 2 is a schematic flow diagram of the required steps to shape a honeycomb geometry through the ionotropic gelation of sodium alginate in a ionic solution of water and divalent cations, with a molding technique, according to the present invention.

The steps of the above-mentioned process are schematically represented in FIG. 2, where the fabrication of a honeycomb geometry of the composite polymer is shown.

Figure 3:
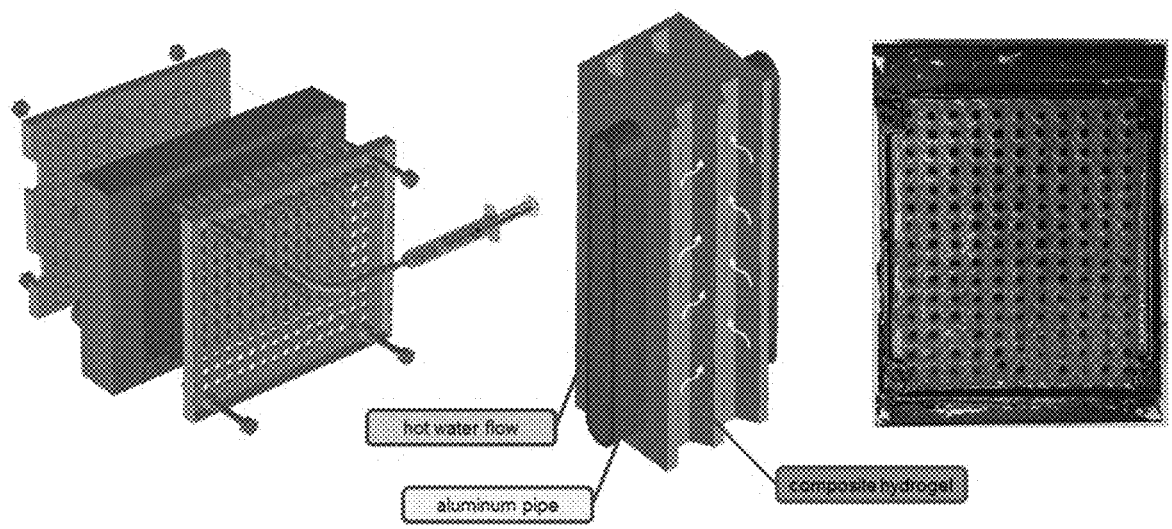
FIG. 3 is a schematic flow diagram of the required steps to shape the same honeycomb geometry, directly on a heat exchanger, according to the present invention.

The same approach can be used to create the honeycomb geometry directly on a heat exchanger, as shown in FIG. 3.

The proposed technological solution amplifies the potentialities highlighted in the previous atmospheric water harvesting device described in the international application published at no. WO 2019/082000 A1 of the same Applicant.

Innovative features of the present invention come from the combination of the new innovative hygroscopic polymer within a heat transfer device and/or a heat conductive mean.

The final result is a component characterized by very high-water uptakes in a large spectrum of operative environment, low regeneration temperature, high rate of regeneration thanks to augmented contact between the material and the heat exchanger media.

Many cycles of humidity capturing/regeneration per day can be performed at temperature around 60° C., thanks to the sorption properties of the composite hydrogel.

Figure 4:
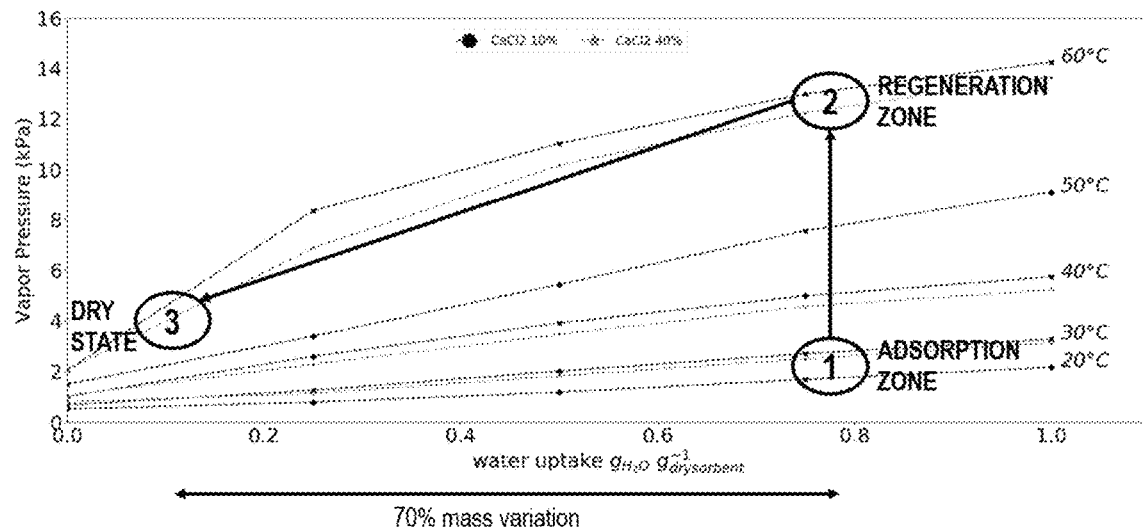
FIG. 4 shows Isothermal Adsorption (IA) curves of the hygroscopic polymer according to the present invention; in particular, the graph of FIG. 4 shows the relation between the water trapped in the pores of the material and the pressure and temperature of the water vapor in an equilibrium contact.

With reference to FIG. 4, the main obtained advantage, i.e. the high water uptakes, achieved with the present invention is shown.

The graph of FIG. 4 shows the water absorption capacity of the polymer at different temperatures and pressures of the water vapor in equilibrium.

During the adsorption phase (operated at temperature between 20-35° C. and pressure of water vapor between 0.6-1 kPa, typical of a dry environment) the water uptake can reach values as much as 0.8 $kg_{H2O}$ $kg_{dry\ sorbent}^{-1}$ (the water uptake of silica gel, the most common hygroscopic material, at the same operative condition is 10-15%, preferably below 0.1 $kg_{H2O}$ $kg_{dry\ sorbent}^{-1}$. Other innovative materials such as MOF exhibit a maximum water uptake, within the same operational conditions of 0.2-0.3 $kg_{H2O}$ $kg_{dry\ sorbent}^{-1}$ as shown in U.S. Pat. No. 10,640,954B2).

The regeneration can be carried out at temperature as low as 60° C., which can reduce the water content up to 0.1 $kg_{H2O}$ $kg_{dry\ sorbent}^{-1}$ also when the ambient is at a temperature as high as 35° C., and the minimum pressure achievable with a water harvesting cycle on this material for condensing released water vapor at ambient temperature, is 5.6 kPa (corresponding to the saturation pressure of water vapor at 35° C.). At this condition no reference material can release vapor at pressure higher than this value, needing the necessity of auxiliary source of cold to drive a full water harvesting cycles within these conditions and an auxiliary need of electrical power and energy. The total amount of water obtained from a full adsorption/regeneration cycle at mentioned conditions is equivalent to the 0.7 $kg_{H2O}$ $kg_{dry\ sorbent}^{-1}$ of mass variation as illustrated in FIG. 4.

The solution take also advantage from the high density of the polymer (650 $kg_{dry\ sorbent}m^{-3}$), increases the total specific density of a machine based on this component. Indeed is possible to extract up to 480 liters of water per cubic meter of composite, providing water for a small people community of up to 32 person per day (WASH-UNICEF establishes a minimum requirement of 15 liter of fresh water per person for the daily drinking, cooking and hygienic washing, in the context of the Sustainable Development Goal 6).

Figure 5:
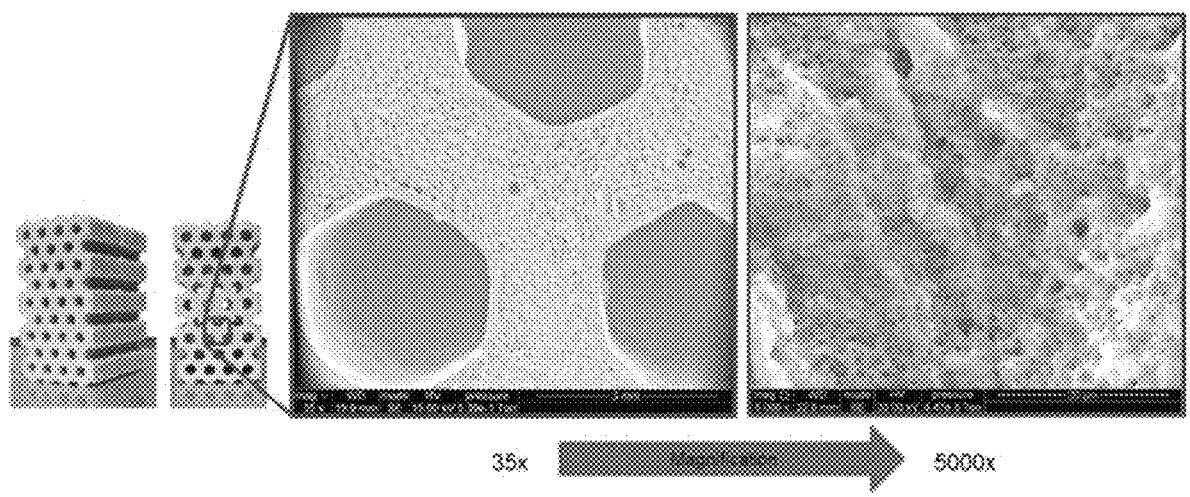
FIG. 5 shows a Scanning Electron Microscopy (SEM) image on the internal structure of honeycomb according to the present invention.

These improved properties are achieved thanks to the high internal porosity and the high internal surface extension of the composite polymer to store the captured water, as shown in the SEM images in FIG. 5.

Figure 6A:
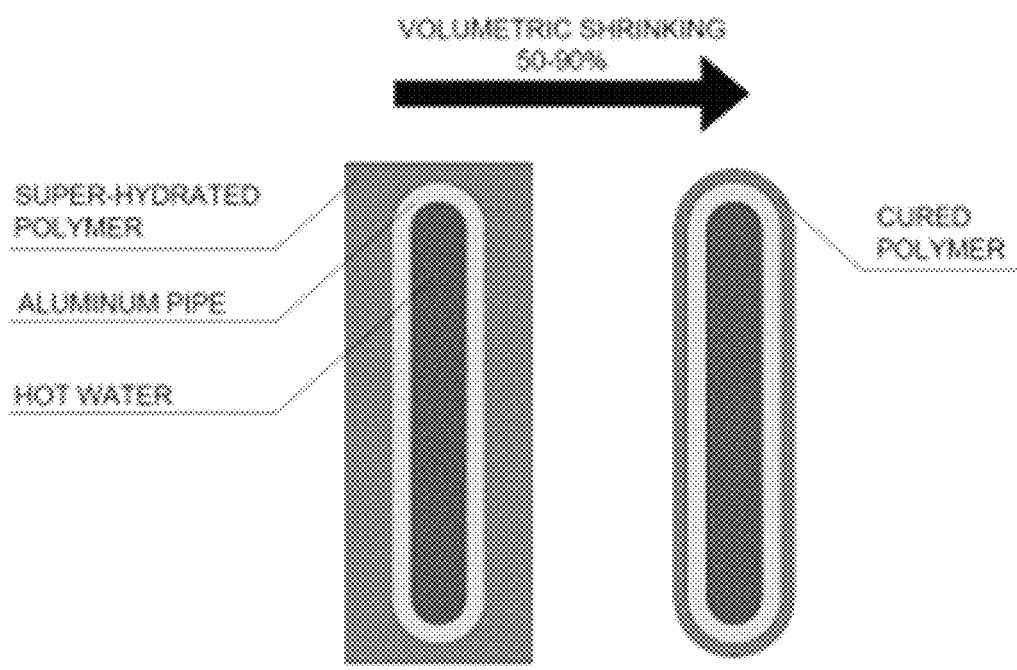
FIG. 6A is a schematic representation of the volume reduction of the polymer caused by the intrinsic shrinking of the biopolymer during the curing stage and after the ionotropic gelation, according to the present invention.
Figure 6B:
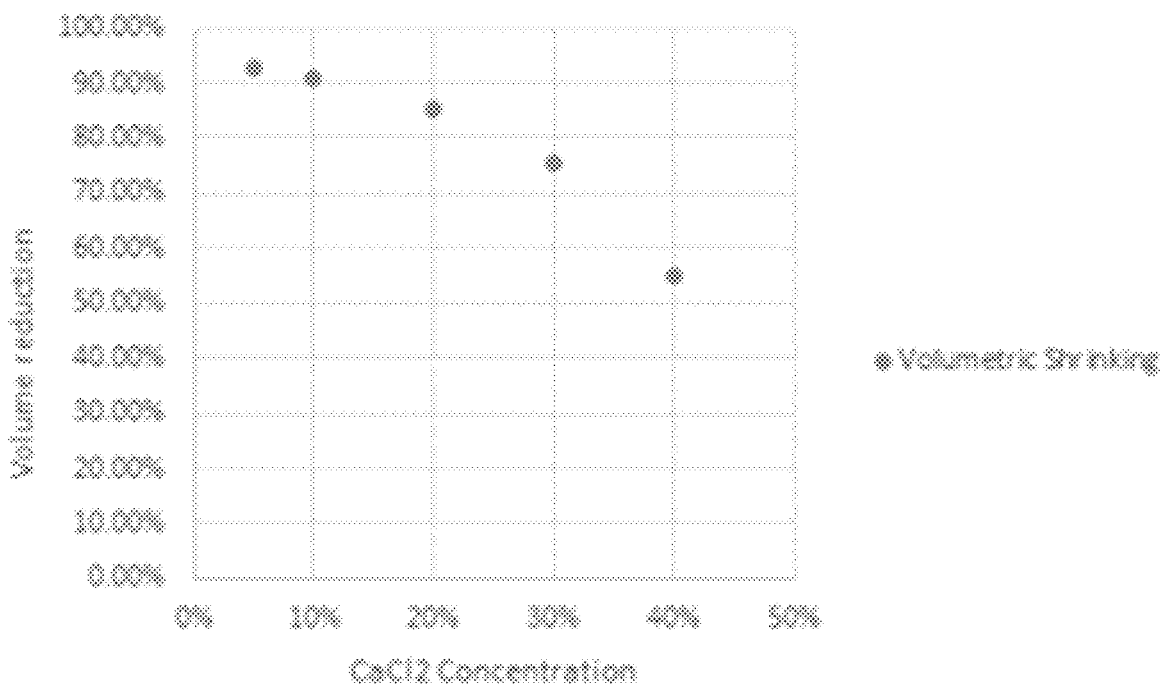
FIG. 6B shows a graph of the volume reduction of the polymer as a function of the calcium chloride ($CaCl_2$) concentration, an example and non exhaustive of divalent cation solution in the water, during the ionotropic gelation according to the present invention.

With reference to FIGS. 6A and 6B, stability of the coating is shown and commented.

The coating over the surface of the heat exchanger HX is realized more through a mechanical effect than a chemical link between the material of the HX and the polymer.

This is obtained thanks to the pressure effect generated by the thermal shrinking of the polymer, during the drying phase after the molding.

The coating completes the production process of the heat exchanger. This is obtained thanks to the tensioning effect generated by the thermal shrinking of the polymer during the curing stage, completing the manufacturing process of the heat exchanger. Just after the ionotropic gelation the polymer is in a super hydrated state, that ends once the material is cured at temperature between 70-90° C. for 12 hours. During the curing, the polymer exhibits a consistent volumetric shrinking, as highlighted in the graph of FIG. 6B, that depends by the concentration of the CaCl$_2$, with values close to 90% of the initial volume for CaCl$_2$ concentrations lower than 10%. This volume reduction creates a permanent stress in the material, leading to the cohesion on the surface of the HX. This type of adhesion is considered as an improved solution respect to typical coatings of sorbent material over thermal conductive materials (e.g. metals) operated through chemical linkers, because should not suffer of the degradation problems typical of coating methods done with chemical linkers. Indeed these typically suffer the water hydration; crack formation for the stress on the internal structure when subjected to fast heating/cooling cycles; being inert respect to water, the final composition of linker plus the sorbent results in reduced water uptake proportionally to the ratio of linker/sorbent; This is discussed in 1) Kalmutzki, M. J.; Diercks, C. S.; Yaghi, O. M. Metal—Organic Frameworks for Water Harvesting from Air. Advanced Materials. Wiley-VCH Verlag Sep. 13, 2018. https://doi.org/10.1002/adma.201704304.

2) A. Freni, L. Bonaccorsi, L. Calabrese, A. Capri, A. Frazzica, A. Sapienza. SAPO-34 coated adsorbent heat exchanger for adsorption chillers, Applied Thermal Engineering, Vol. 82,2015,pg. 1-7,https://doi.org/10.1016/j.applthermaleng.2015.02.052.

This invention proposes a method for creating the mechanical adhesion between the sorbent and the media for the heat exchange based on the thermal shrinking of the sorbent itself. This is realized through the curing of the material after the jellification process. The water rejected during the curing reduced the distances between different parallel chain of the biopolymer, reducing the volume of the entire composite, and increasing the concentration of divalent ions diluted with water in the hydrogel. This further increase polymer interchain cross linking that, remaining stable after the curing, create an adherent layer around the solid structure of the heat exchanger as depicted in FIG. 6A.

This type of adhesion does not suffer of the degradation problems typical of coating process done with chemical linkers, and is realized through a material that is a sorbent itself.

The adsorption heat exchanger according to one aspect of the present invention, independent and autonomously usable with respect to the other aspects of the invention, includes a hygroscopic composite biopolymer 2, a heat exchange medium 4 in contact with said hygroscopic composite biopolymer 2 and a hollow conduit in contact with said heat exchange medium 4, into which hollow conduit either a cooling fluid 6 or a heating fluid 8 are alternately made to pass.

The hygroscopic composite biopolymer 2 includes sodium alginate and calcium bentonite in a predetermined ratio the heat exchange medium 4 has honeycomb geometry so that the adsorption heat exchanger 1 can be operated under high ambient temperatures and low relative humidity conditions, which are typical of arid climates.

Preferably, the predetermined ratio between sodium alginate and calcium bentonite ranges from 1:1 to 1:10; more preferably, the predetermined ratio between sodium alginate and calcium bentonite is 1:1-1:2.

Preferably, the sodium alginate has a concentration ranging between 0.5 and 4% of the entire mass of the hydrogel as in the supersaturated state.

Preferably, the honeycomb geometry has cell size ranging of 3-5 mm, with an intercell perpendicular distance not greater than the half of cell size. This geometry is inserted between two elements for the heat transfer, constituting the repeated base of the adsorption heat exchanger as shown in FIG. 3. Shape and section of the heat exchanger pipes can be different from what shown, without changing the intrinsic characteristic of the configuration. The same is valid for the use of conductive fins to increase the surface of the heat exchange media, or different materials for the heat exchange media.

Figure 7:
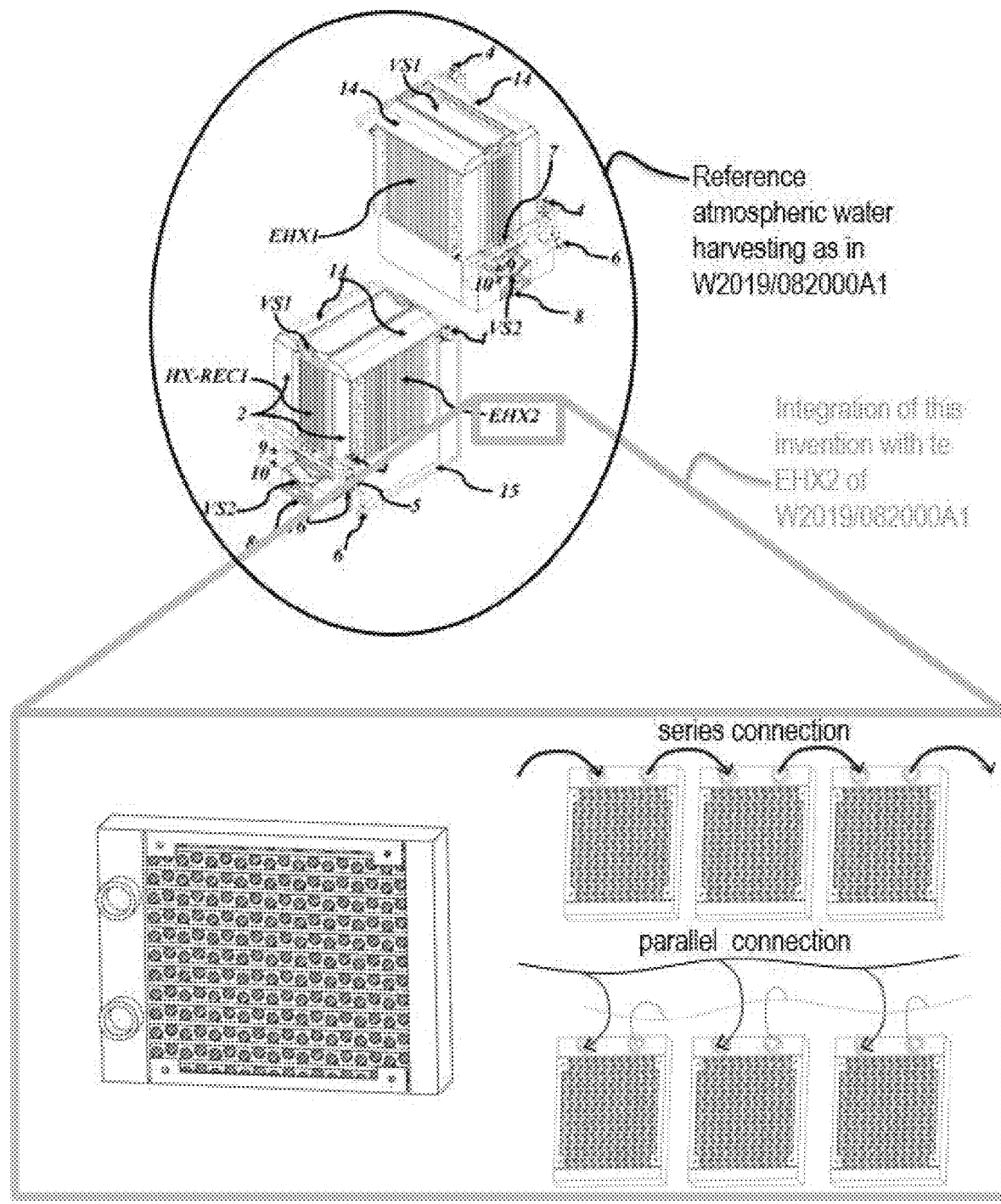
FIG. 7 is a schematic representation of an atmospheric water harvesting device including an adsorption heat exchanger according to the present invention.

According to another aspect of the present invention, independent and autonomously usable with respect to the other aspects of the invention, and referring to FIG. 7, an atmospheric water harvesting device 10 is herein disclosed resulting from the coupling of the present invention with an atmospheric water harvesting cycle. The atmospheric water harvesting device 10 is such that it can provide freshwater in regions around the world where physical and/or economical water scarcity force people to find alternative solutions for water access.

Preferably, the atmospheric water harvesting device 10 is the one described in the international application published at no. WO 2019/082000 A1 of the same Applicant.

The atmospheric water harvesting device 10 includes at least one adsorption heat exchanger 1 as described above, or otherwise composed of multiple modules connected in series either in parallel as showed in FIG. 7.

According to another aspect of the present invention, independent and autonomously usable with respect to the other aspects of the invention a process for producing an adsorption heat exchanger 1 is herein disclosed.

The process for producing an adsorption heat exchanger 1 includes the following steps:
  preparing a hygroscopic composite biopolymer 2 by realizing a viscous gel containing the main components of the hygroscopic polymer 2, i.e. sodium alginate and calcium bentonite in a predetermined ratio (step 100);
  preparing a heat exchange medium 4 having honeycomb geometry and placing it in contact with said hygroscopic composite biopolymer 2 (step 101),
  preparing a hollow conduit and placing it in contact with said heat exchange medium 4 (step 102), and injecting the viscous solution until, after a degassing procedure as illustrated before, all the empty spaces are filled with the gel. Then finally drive jellification process through the deep immersion in the divalent ions/water solution
  alternately making to pass into said hollow conduit either a cooling fluid 6 or a heating fluid 8 (step 103).

The adsorption heat exchanger and its production process according to the present invention are described in detail hereinbelow, and their efficacy too, with reference to the following Examples, which have been developed on the basis of experimental tests and are to be understood as illustrative but not limitative of the present invention.

Example 1

Figure 8A:
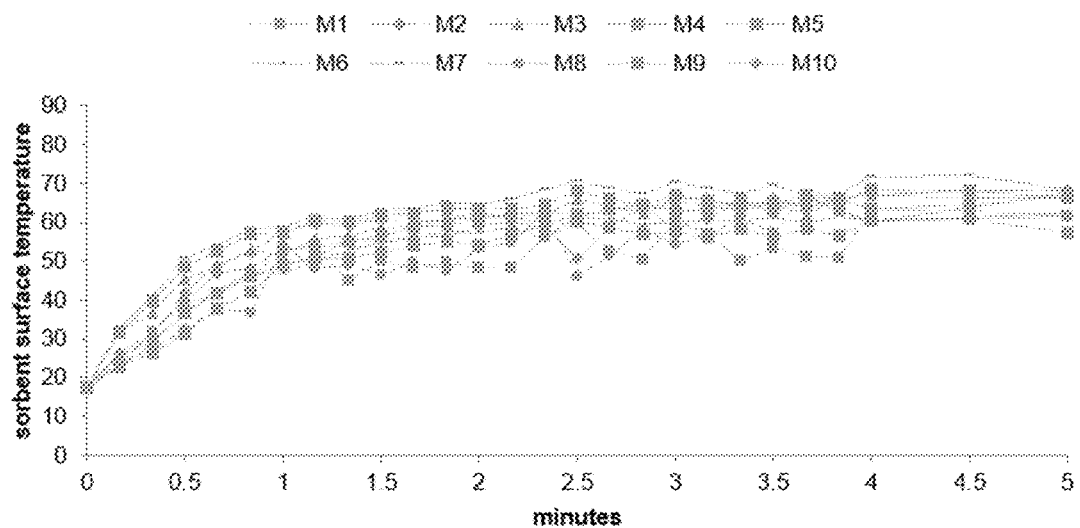
FIG. 8A is a graph showing the transient required by the component to reach operative condition for regeneration, 60° C., with an air flow of 1 m/s and a water flow rate of 60 liter per minute, a non exhaustive example of operative condition for the component. In the graph are depicted different points acquired with a IR camera pointed towards the perpendicular of the inlet section of the ADS-HX as shown in FIG. 8B.
Figure 8B:
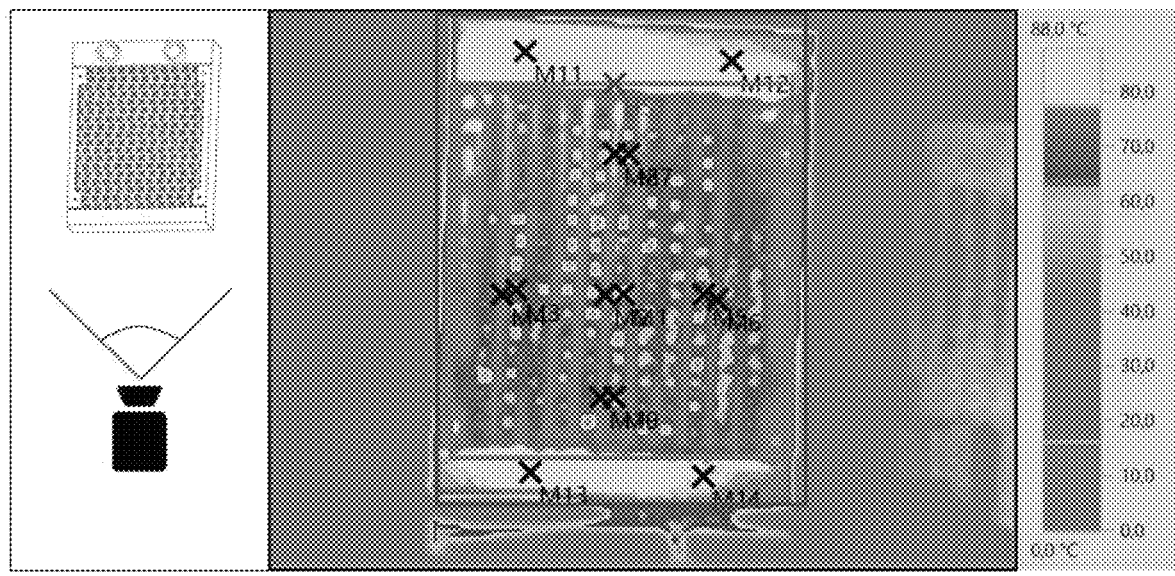
FIG. 8B is the temperature distribution measured through an infrared camera, observing the transient during the activation of the regeneration. The infrared camera is looking towards the section of the ADS-HX, as depicted in the left.
Figure 9A:
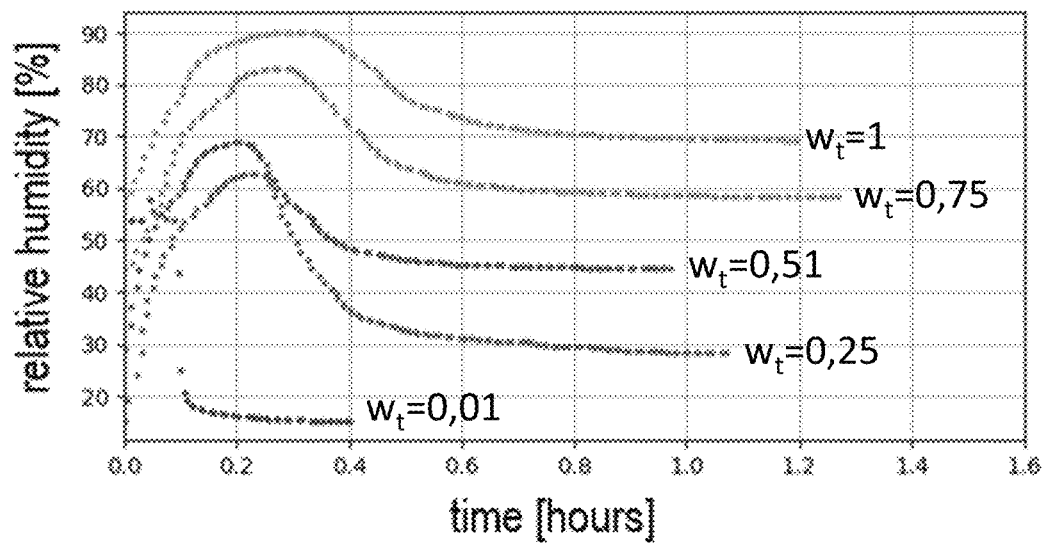
FIG. 9A is depicting the required time to reach the equilibrium condition corresponding to an increase of water uptake of 25%, together with the relative humidity corresponding to the equilibrium value.
Figure 9B:
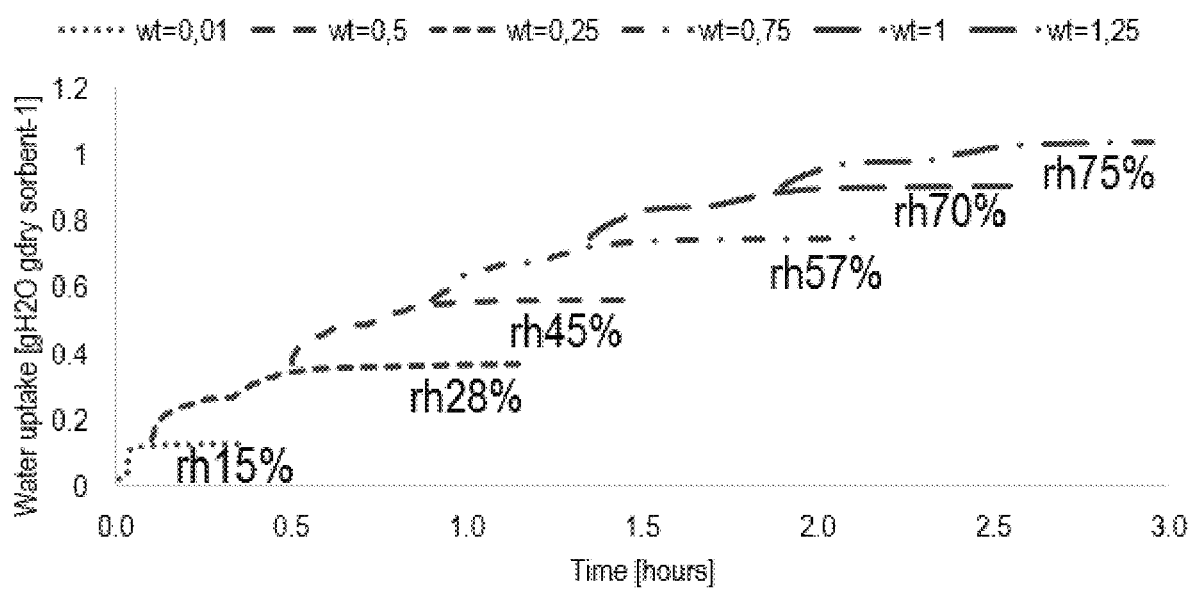
FIG. 9B is depicting a functioning map of the ADS-HX indicating the required time to reach the equilibrium water uptake (gradually stepped at 0.25-0.5-0-75-1 $g_{H2O}\ g_{dry\ sorbent}^{-1}$) with an air flow of 1 m s$^{-1}$ and an air temperature of 30° C. and relative humidity respectively of 15-28-45-57-70-75%.

In a configuration of the ADS-HX, the ratio between total cell section and the ADS-HX is close to 70%, with a correlated pressure drops on the air side lower than 1 Pa cm$^{-2}$, with a mean velocity of the air stream at 1 m s$^{-1}$. The thickness of the ADS-HX is 15 mm, containing ~7 kg of dry sorbent per m$^2$ of ADS-HX. Pipe channels have a rectangular shape geometry with 1×8 mm section, and a maximum channel thickness of 1 mm, allowing the good flowing of water at the ambient temperature in the case of adsorption phase (~30° C.), or at the regeneration temperature (~60° C.) in case of regeneration phase. According to experimental testing, the system requires 2.5 minutes, at 1 m s$^{-1}$ of air stream velocity and 60 liters min$^{-1}$ of hot water flow, to reach the equilibrium temperature (60° C.) for the activation of the regeneration phase, as shown in FIG. 8. Within this configuration air flow is sufficiently high to reduce the resistances for the mass transfer only to the diffusion mechanisms through alginate chains. Within this testing conditions, performances of the heat exchanger are showed in FIG. 9A and FIG. 9B. A single step of water uptake increase, corresponding to 0.25 $g_{H2O} g_{dry\,sorbent}^{-1}$, is performed on the ADS-HX in approximately 30 minutes as showed in FIG. 9A, where the time to reach the equilibrium is depicted against the relative humidity of the ambient air, at 30° C. After 30 minutes all the curves become flat having reached the equilibrium corresponding respectively to a water uptake of 0.25, 0.5, 0.75, 1 $g_{H2O} g_{dry\,sorbent}^{-1}$, as shown also in FIG. 9B. This means that an ADS-HX with ~7 kg capture 3.5 liters of water in less than one hour, and require the same amount of time to be regenerated back, collecting the water as disclosed in WO 2019/082000 A1 by the same Applicant , and a regeneration temperature of 60° C.

If the system is powered with solar energy will easily perform 2-3 cycle per day, and if the atmospheric water harvesting system is arranged as disclosed in WO 2019/082000 A1, with two ADS-HX working in batch operation, a production of 21 liters is obtained in six hour of daily operation, with an energy consumption not higher than 1 kWh$_{th}$liter$^{-1}$.

If the system is powered with a more stable source of heat, such as waste heat from a process or from industry with a schedule of 24 hour per day, 12 cycles per day can be performed on a single ADS-HX, and if the atmospheric water harvesting system is arranged as disclosed in WO 2019/082000 A1, with two ADS-HX working in batch operation, a daily production of 84 liters.

The adsorption heat exchanger and its production process according to the present invention are compared with known solutions, as described hereinbelow.

[Ref#1] is a adsorption/regeneration experiment on MOF-801 executed both in laboratory condition (RH controlled environmental chamber with solar simulation) and in outdoor condition; [Ref#2] is another configuration of prototype based on MOF-801, and equipped with an optical lens to concentrate solar radiation; [Ref#3] is a prototype based on MOF 303 and powered with solar PV panels to regenerate the sorbent material with an electrical resistance; [Ref#4] is a passive water harvesting device activated with solar energy and using a composite constituted of a holding matrix with the molecular sieve MCM-41 impregnated with $CaCl_2$ within 30-60% of concentration; [Ref#5] is a prototype equipped with a packed bed constituted of an impregnated carbon fiber with $CaCl_2$ and regenerated with hot air drying, heated up by a solar air collector; In [Ref#6] is experienced the weight variation of three different anhydrous salts ($CuCl_2$, $CuSO_4$, $MgSO_4$) between the full dry and saturated state, using direct solar radiation as free source for the salt regeneration; [Ref#7] shows the performances of another hydrogel, based on Polyacrylamide-$CaCl_2$ addicted with carbon nanotube to directly capture the sun radiation, convert it into heat directly on the surface of the sorbent, then directly regenerating the sorbent. The prototype showed in [Ref#8] is constituted of a rotating cylinder, with a coating containing nano hollow carbon sphere, impregnated with LiCl, and regenerated with a solar flux of 0.8-1.2 kW m$^{-2}$.

The results of the comparison between the present invention and the known solutions are summarized in the below Table.

TABLE

| #Ref | Adsorption | | | | | | Regeneration | | | |
|---|---|---|---|---|---|---|---|---|---|---|
| | $T_{amb}$ [° C.] | $T_{ADS}$ [° C.] | $RH_{ADS}$ [%] | $T_{dew}$ [° C.] | $W_{ads}$ [g g-1] | Time [hours] | $T_{REG}$ [° C.] | $W_{REG}$ [g g-1] | Time [hours] | $\Delta_W$ [g g-1] |
| this disclosure | 30 | 30 | 15 | 0.6 | 0.15 | 0.2 | 60 | 0.1 | 0.3 | 0.05 |
|  | 30 | 30 | 28 | 9.5 | 0.25 | 0.5 | 60 | 0.1 | 0.6 | 0.15 |
|  | 30 | 30 | 45 | 16.8 | 0.5 | 1 | 60 | 0.1 | 1.1 | 0.4 |
|  | 30 | 30 | 57 | 20.6 | 0.75 | 1.4 | 60 | 0.1 | 1.5 | 0.65 |
|  | 30 | 30 | 70 | 24 | 1 | 1.8 | 60 | 0.1 | 1.8 | 0.9 |
|  | 30 | 30 | 75 | 25 | 1.25 | 2.5 | 60 | 0.1 | 2.6 | 1.15 |
| 1 | 35 | 35 | 20 | 10 | 0.25 | 1.17 | 80 | 0.02 | 0.5 | 0.23 |
| 2 | 25 | 25 | 65 | 18 | 0.35 | all night | 66 | 0.05 | 8 | 0.3 |
|  | 20 | 17 | 40 | 6 | 0.28 | 8 ÷ 11 | 74 | 0.16 | 3.67 | 0.12 |
| 3 | 23 | 20 | 50 | 12 | 0.31 | 8 ÷ 11 | 74 | 0.175 | 4 | 0.135 |
|  | 20 | 17 | 40 | 6 | 0.28 | 8 ÷ 11 | 100 | 0.01 | 2 | 0.27 |
|  | 27 | — | 32 | 9 | — | 141 | 120 | — | 91 | 0.13 ÷ 0.16 |
| 4 | 15 ÷ 25 | — | 10 ÷ 70 | −9 ÷ 9 | — | 12 ÷ 152 | 120 | — | 8 ÷ 10$^2$ | 0.03 ÷ 0.12 |
|  | 10 ÷ 15 | — | 80 ÷ 90 | 6.7 ÷ 13.4 | 0.8 ÷ 1.4 | 24 | 80 | <0.1 | 2.5 | — |
| 5 | 10 ÷ 15 | — | 80 ÷ 90 | 6.7 ÷ 13.4 | 0.87 | all nigth | 80 | 0.26 | all day | 0.61 |
|  | 25 | — | 70 | 19.2 | 0.53 | 8 | 85 | 0.14 | 5 | 0.39 |
| 6 | 30 ÷ 33 | — | 70 ÷ 85 | 30 | 0.27 | 11 | 80 | 0.02 | 7.5 | 0.25 |
|  | 22 | — | 60 | 13.9 | — | >24 | 80 | — | 1.5 | 0.17 |
| 7 | 22 | — | 60 | 13.9 | — | >24 | 80 | — | 1.5 | 0.21 |
|  | 22 | — | 60 | 13.9 | — | >24 | 80 | — | 1.5 | 0.16 |
|  | 26 | — | 60 ÷ 70 | 17.6 ÷ 20 | 1.06 | 15 | 75 | 0.49 | 2.5 | 0.57 |
| 8 | 22 | 22 | 60 | 12 | — | 33 | 47 ÷ 50 | — | 13 | 0.1 |

1) Kim H, Yang S, Rao S R, Narayanan S, Kapustin E A, Furukawa H, et al. Water harvesting from air with metal-organic frameworks powered by natural sunlight. Science (80-) 2017;356:430-4. doi:10.1126/science.aam8743.
2) Kim H, Rao S R, Kapustin E A, Zhao L, Yang S, Yaghi O M, et al. Adsorption-based atmospheric water harvesting device for arid climates. Nat Commun 2018;9. doi:10.1038/s41467-018-03162-7.
3) Hanikel N, Prévot M S, Fathieh F, Kapustin E A, Lyu H, Wang H, et al. Rapid Cycling and Exceptional Yield in a Metal-Organic Framework Water Harvester. ACS Cent Sci 2019. doi: 10. 1021/acscentsci. 9b00745.
4) Ji J G, Wang R Z, Li L X. New composite adsorbent for solar-driven fresh water production from the atmosphere. Desalination 2007;212:176-82. doi: 10.1016/j.desal.2006.10. 008.
5) Wang J Y, Liu J Y, Wang R Z, Wang L W. Experimental investigation on two solar-driven sorption based devices to extract fresh water from atmosphere. Appl Therm Eng 2017;127:1608-16. doi:10.1016/j.applthermaleng.2017.09.063.

6) Li R, Shi Y, Shi L, Alsaedi M, Wang P. Harvesting Water from Air: Using Anhydrous Salt with Sunlight. Environ Sci Technol 2018;52:5398-406. doi:10.1021/acs.est.7b06373.

7) Li R, Shi Y, Alsaedi M, Wu M, Shi L, Wang P. Hybrid Hydrogel with High Water Vapor Harvesting Capacity for Deployable Solar-Driven Atmospheric Water Generator. Environ Sci Technol 2018;52:11367-77. doi: 10.1021/acs. est.8b02852.

8) Li R, Shi Y, Wu M, Hong S, Wang P. Improving atmospheric water production yield: Enabling multiple water harvesting cycles with nano sorbent. Nano Energy 2020;67:104255. doi:10.1016/j.nanoen.2019.104255.

The aforesaid Table shows most important information for the comparison of the invention disclosed within this document, with referenced literature. The comparison is done checking the information on the environmental conditions during adsorption; the water uptake obtained during the adsorption phase; the regeneration temperature; the variation of water uptake between the end of adsorption and the end of regeneration. All the references in the Table showed adsorption performances with a dew point condition higher than the minimum requirements showed by the composite biopolymer disclosed here. Indeed, a considerable water uptake ($0.15\ g_{H2O}\ g_{dry\ sorbent}^{-1}$) is obtained also with a dew point ($T_{dew}$ in the table) of 0.6° C. (equivalent to a dry bulb temperature of 30° C. and a relative humidity of 15%), characteristics that is hardly reachable with the other materials.

In almost all the reference the variation of water uptake between the end of adsorption ad the end of regeneration, the parameter identified with the column $\Delta w$ in the table, is lower than what is obtained within this disclosure at the different RH conditions. Further on required time for adsorption and regeneration are quite higher (3-4 times) than what experienced with the ADS-HX configuration, disclosed within this document. Finally, in almost all the references, regeneration is driven at temperatures much higher than 60° C., as experienced with the ADS-HX configuration disclosed within this document.

As it is deducible from the above description, the innovative technical solution herein described has the following advantageous features:

large water uptake capacity in dry climates, specifically water uptake of 70%—on the dry basis—achievable with an environment of 20-35° C., preferably 20-30° C. and 1 kPa or below of water vapor pressure;

biocompatibility, thanks to the fact that the production process of the sorbent material in its final configuration does not involve the use of toxic compounds; only food-grade chemicals are required for the production process, eliminating any contamination risk of the liquid water produced and/or of the conditioned air;

significant performance improvement with respect to the current commercial approaches employed for water vapor capture;

answer to the increasing demand of reliable, sustainable and affordable solutions to provide freshwater even in remote areas;

fast cycles of water capture/regeneration;

cheap and industrially available starting materials;

manufacturability through injection molding: prior to the solidification through the gelation process, the sorbent and its constituents are in the form of a viscous fluid; this facilitates the injection of the fluid into a mold first, driving later the gelation at ambient temperature and pressure, creating the desired final shape of the hydrogel;

application of the same process in deep coating over the surface for heat exchange of various substrates (e.g. aluminum, copper, polymeric materials, etcetera);

fabrication of the material in a way that can be easily scaled up; the production process of both the material and the component does not require particular efforts on building a specific production environment and this leads to a reduction of costs for the production of the material and component;

easy scalable, low cost and quick functionalizing process for producing exchangers overcoming the drawbacks of the previous proposed technics;

suitable to be carried out in any climate conditions.

Therefore, the invention herein described presents a significant improvement with respect to the current commercial approaches employed for water vapor capture from ambient air under even high ambient temperatures and low relative humidity conditions, which are typical of arid climates, and, moreover, it answers to the increasing demand of high efficient solutions for the purposes of both atmospheric water harvesting and air conditioning.

From the above description it is clear, therefore, that the adsorption heat exchanger and its production process as described hereinabove allow to reach the proposed objects.

It is similarly evident, to a person skilled in the art, that modifications and variants can be made to the solution described with reference to the attached figures, without departing from the teaching of the present invention and from the scope as defined in the appended claims.

What is claimed is:

1. An adsorption heat exchanger comprising
a hygroscopic composite biopolymer,
a heat exchange medium in contact with the hygroscopic composite biopolymer, and
a hollow conduit in contact with the heat exchange medium, into which hollow conduit either a cooling fluid or a heating fluid are alternately made to pass
wherein
the hygroscopic composite biopolymer comprises sodium alginate and calcium bentonite in a predetermined ratio, and in that
the heat exchange medium has a honeycomb geometry, so that the adsorption heat exchanger can be operated under high ambient temperatures and low relative humidity conditions, which are typical of arid climates.

2. The adsorption heat exchanger according to claim 1, wherein the predetermined ratio between the sodium alginate and the calcium bentonite ranges from 1:1 to 1:10.

3. The adsorption heat exchanger according to claim 2, wherein the predetermined ratio between the sodium alginate and the calcium bentonite is 1:1-1:2.

4. The adsorption heat exchanger according to claim 1, wherein the sodium alginate has a concentration ranging between 0.5 and 4% of an entire mass of a hydrogel as in a supersaturated state.

5. The adsorption heat exchanger according to claim 1, wherein the honeycomb geometry has a cell size raging in 3-5 mm, with an intercell perpendicular distance not greater than a half of the cell size; this geometry is inserted between two elements for a heat transfer, constituting a repeated base of the adsorption heat exchanger.

6. An atmospheric water harvesting device comprising at least one adsorption heat exchanger according to claim 1, so that the atmospheric water harvesting device can provide a freshwater in regions around the world where physical and/or economical water scarcity force people to find alternative solutions for water access.

7. A process for producing an adsorption heat exchanger comprising the following steps:
 preparing a hygroscopic composite biopolymer by realizing a viscous gel containing main components of the hygroscopic polymer, i.e. sodium alginate and calcium bentonite in a predetermined ratio (step 100);
 preparing a heat exchange medium having a honeycomb geometry and placing it in contact with the hygroscopic composite biopolymer (step 101),
 preparing a hollow conduit and placing it in contact with the heat exchange medium (step 102), and
 alternately making to pass into the hollow conduit either a cooling fluid or a heating fluid (step 103).

8. The process according to claim 7, wherein the viscous gel is prepared by mixing a powder of the sodium alginate (2% by weight) and the calcium bentonite (4-10% by weight) with deionized water, until a complete mixing and a homogeneous fluid is obtained.

9. The process according to claim 8, wherein the viscous gel is degassed, under a vacuum at a relative pressure between 200-500 mbar for at least 20 minutes.

10. The process according to claim 9, wherein the viscous and degassed gel is injected in a prefabricated mold with a honeycomb geometry and the mold is deeply immersed in the deionized water/$CaCl_2$ solution for at least 12 hours until a complete jellification.

\* \* \* \* \*